US012798164B2

(12) United States Patent

Hsiao et al.

(10) Patent No.: US 12,798,164 B2
(45) Date of Patent: Nov. 17, 2026

(54) METHOD FOR COMBINING HETEROGENEOUS METAL PARTS

(71) Applicant: GIANT GLORY INTERNATIONAL LIMITED, Apia (WS)

(72) Inventors: Cheng-Ping Hsiao, Pingtung County (TW); Hsiang-Jui Wang, Taoyuan City (TW)

(73) Assignee: GIANT GLORY INTERNATIONAL LIMITED, Apia (WS)

( * ) Notice: Subject to any disclaimer, the term of this patent is extended or adjusted under 35 U.S.C. 154(b) by 324 days.

(21) Appl. No.: 18/421,145

(22) Filed: Jan. 24, 2024

(65) Prior Publication Data

US 2025/0050557 A1 Feb. 13, 2025

(30) Foreign Application Priority Data

Aug. 7, 2023 (TW) ................................ 112129518

(51) Int. Cl.
*B29C 45/14* (2006.01)
*B29K 105/00* (2006.01)
(Continued)

(52) U.S. Cl.
CPC ............................ *B29C 45/14467* (2013.01); *B29C 2045/1454* (2013.01); *B29K 2105/0094* (2013.01);
(Continued)

(58) Field of Classification Search
CPC .............. B29C 45/14; B29C 45/14467; B29C 2045/1454
See application file for complete search history.

(56) References Cited

U.S. PATENT DOCUMENTS 5,208,884 A * 5/1993 Groh .................... G02B 6/2804 385/44
5,449,480 A * 9/1995 Kuriya ................. H05K 3/4652 264/261

(Continued)

FOREIGN PATENT DOCUMENTS

CN 119435533 A * 2/2025 ............ F16B 11/006
JP 2013155757 A * 8/2013

(Continued)

OTHER PUBLICATIONS

Chien, Minyuan, et al. "Impact of Runner Size, Gate Size, Polymer Viscosity, and Molding Process on Filling Imbalance in Geometrically Balanced Multi-Cavity Injection Molding." Polymers 16.20 (Oct. 11, 2024): 2874. (Year: 2024).*

(Continued)

*Primary Examiner* — Benjamin A Schiffman
(74) *Attorney, Agent, or Firm* — Thomas | Horstemeyer, LLP

(57) ABSTRACT

A method for combining heterogeneous metal parts includes steps of: a) disposing a first metal part and a second metal part in a lower mold cavity of a lower mold, the lower mold cavity having a lower portion and an upper portion, the lower mold including a channel that communicates with an external environment; b) combining an upper mold and the lower mold with an upper mold cavity of the upper mold facing the lower mold cavity, the upper mold cavity being defined by an inner base surface and an inner surrounding surface; and c) injecting a bonding adhesive into the channel so as to fill the lower portion of the lower mold cavity and a gap between the first metal part and the second metal part with the bonding adhesive.

15 Claims, 5 Drawing Sheets

(51) Int. Cl.
*B29K 263/00* (2006.01)
*B29K 705/00* (2006.01)

(52) U.S. Cl.
CPC .. *B29K 2105/0097* (2013.01); *B29K 2263/00* (2013.01); *B29K 2705/00* (2013.01)

(56) References Cited

U.S. PATENT DOCUMENTS

| | | | | |
|---|---|---|---|---|
| 6,255,587 | B1 * | 7/2001 | Lambert | H01R 43/007 174/541 |
| 7,601,289 | B2 * | 10/2009 | Hamano | B29C 45/27 425/190 |
| 8,216,501 | B2 * | 7/2012 | Egerer | B29C 43/18 264/261 |
| 8,514,494 | B2 * | 8/2013 | Alcazar | B29C 45/14434 359/819 |
| 8,695,211 | B2 * | 4/2014 | Hyuga | H01H 13/063 29/527.1 |
| 9,281,101 | B2 * | 3/2016 | Tachi | H01B 3/447 |
| 10,148,000 | B2 * | 12/2018 | Hill | B29C 45/14311 |
| 10,675,798 | B2 * | 6/2020 | Mencel, Jr. | B29C 45/14508 |
| 10,931,800 | B2 * | 2/2021 | Li | B29C 45/0053 |
| 10,960,586 | B2 * | 3/2021 | Takahashi | B60J 10/45 |
| 11,338,484 | B2 * | 5/2022 | Nomizo | F16L 13/103 |
| 11,590,608 | B2 * | 2/2023 | Itakura | B23K 26/00 |
| 12,305,677 | B2 * | 5/2025 | Hsiao | F16B 11/006 |
| 2002/0168499 | A1 * | 11/2002 | Goldbach | B29C 45/14467 264/261 |
| 2011/0318591 | A1 * | 12/2011 | Wu | B32B 9/005 264/261 |
| 2015/0104638 | A1 * | 4/2015 | Jeltsch | B29C 45/14467 428/221 |
| 2016/0120046 | A1 * | 4/2016 | Ou | H05K 5/0086 343/702 |
| 2020/0353656 | A1 * | 11/2020 | Okonski | B29C 45/14508 |
| 2021/0000308 | A1 * | 1/2021 | Hayashida | A47K 13/00 |

FOREIGN PATENT DOCUMENTS

| | | | | |
|---|---|---|---|---|
| JP | 2014210548 A | * | 11/2014 | B60R 21/206 |
| KR | 20190027304 A | * | 3/2019 | H04M 1/026 |

OTHER PUBLICATIONS

Zhang, Nan, et al. “Effects of gate design and cavity thickness on filling, morphology and mechanical properties of microinjection mouldings.” Materials & Design 83 (Jun. 20, 2015): 835-847. (Year: 2015).*
Xie, Lei, and Gerhard Ziegmann. “Effect of gate dimension on micro injection molded weld line strength with polypropylene (PP) and high-density polyethylene (HDPE).” The International Journal of Advanced Manufacturing Technology 48.1 (Sep. 4, 2009): 71-81. (Year: 2009).*
Translation of JP 2013-155757 A, Aug. 15, 2013 (Year: 2013).*
Translation of KR 20190027304 A, Mar. 14, 2019 (Year: 2019).*

* cited by examiner

METHOD FOR COMBINING HETEROGENEOUS METAL PARTS

CROSS-REFERENCE TO RELATED APPLICATION

This application claims priority to Taiwanese Invention Patent application Ser. No. 11/212,9518, filed on Aug. 7, 2023, the entire disclosure of which is incorporated by reference herein.

FIELD

The disclosure relates to a combining method, and more particularly to a method for combining heterogeneous metal parts.

BACKGROUND

With the progress of the technology industry, the demand for consumer electronics, such as computers and peripherals thereof, is becoming increasingly greater. The design of the appearance of these consumer electronics is becoming important as consumers are paying greater attention to it. As a result, the aesthetics of the shells of these consumer electronics (e.g., cell phones, laptops, and tablets) have received much attention. Among the existing types of these shells of the consumer electronics, the most common ones may each be constituted of multiple parts with different materials such as a metal-plastic combined shell or a shell constituted of heterogeneous metal parts. Given that metal parts are capable of reflecting light, thereby may visually attract the consumers' attention, metal parts are highly valued. However, the lack of integration of heterogeneous metal parts still poses as a challenge to the technology industry.

Referring to FIGS. 1 and 2, CN106544674A discloses a surface treatment process for combining a magnesium casting piece 11 and an aluminum frame 12, which includes step S1, step S2, step S3, step S4, step S5, and step S6.

Step S1 involves polishing and sandblasting a bonding surface 111 of the magnesium casting piece 11 and a bonding surface 121 of the aluminum frame 12, so as to provide a good bonding surface for subsequent connection and thermal spraying. Step S2 involves coating a glue 13 on the bonding surface 111 of the magnesium casting piece 11. Step S3 involves connecting the bonding surface 121 of the aluminum frame 12 with the bonding surface 111 of the magnesium casting piece 11 through the glue 13 so as to form a workpiece assembly. Step S4 involves thermal spraying a nickel-aluminum material 14 in a gap between the magnesium casting piece 11 and the aluminum frame 12. Step S5 involves partially polishing the nickel-aluminum material 14 so as to make the workpiece assembly integrally formed and looking more natural as one piece. Step S6 involves paint spraying a surface of the entire workpiece assembly.

Although CN106544674A is capable of resolving the lack of integration between heterogeneous metal parts, CN106544674A is still unable to completely combine the magnesium casting piece 11 and the aluminum frame 12 in a single step (i.e., step S3), and needs to thermal spray the nickel-aluminum material 14 (i.e., in step S4) in the gap between the magnesium casting piece 11 and the aluminum frame 12 so as to completely combine the magnesium casting piece 11 and the aluminum frame 12. Therefore, CN106544674A involves an additional step in combining the magnesium casting piece 11 and the aluminum frame 12.

Improving and simplifying the process of combining heterogeneous metal parts is thus the issue at hand.

SUMMARY

Therefore, an object of the disclosure is to provide a method for combining heterogeneous metal parts that can alleviate at least one of the drawbacks of the prior art.

According to the disclosure, the method includes steps of:

a) disposing a first metal part and a second metal part in a lower mold cavity of a lower mold, the first metal part and the second metal part being made of different materials, wherein the lower mold cavity has a lower portion, and an upper portion on which the first metal part and the second metal part are disposed spaced apart laterally, a top surface of the first metal part and a top surface of the second metal part being disposed outwardly of the lower mold, the lower mold including a channel that extends from an inner surface in the lower portion of the lower mold cavity to an outer surface of the lower mold and that communicates with an external environment;

b) combining an upper mold and the lower mold with an upper mold cavity of the upper mold facing the lower mold cavity, wherein the upper mold cavity is recessed from a combining surface of the upper mold in a direction away from the lower mold to terminate at an inner base surface, and is defined by the inner base surface and an inner surrounding surface that interconnects the combining surface and the inner base surface, the combining surface of the upper mold being in contact with the lower mold when the upper mold and the lower mold are combined, the inner base surface being in contact with the top surface of the first metal part and the top surface of the second metal part after combining the upper mold and the lower mold; and c) injecting a bonding adhesive into the channel so as to fill the lower portion of the lower mold cavity and a gap between the first metal part and the second metal part with the bonding adhesive, wherein the bonding adhesive has a viscosity so that the bonding adhesive is unable to flow outside the lower mold after being injecting into the channel.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
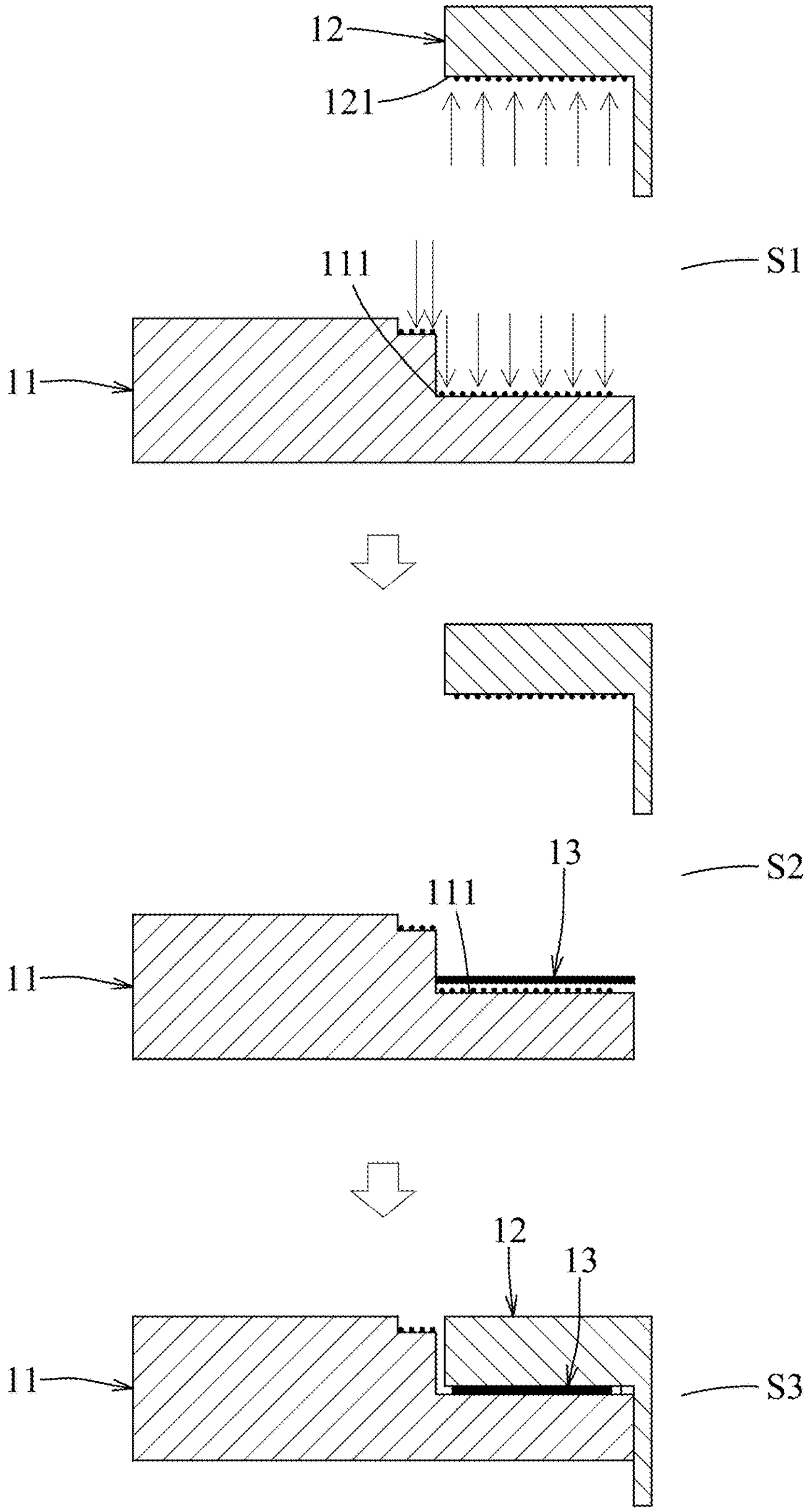
FIG. 1 PRIOR ART
FIGS. 1 and 2 illustrate consecutive steps S1-S6 of a surface treatment process for combining a magnesium casting piece and an aluminum frame as disclosed in CN106544674A.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

According to an embodiment of the disclosure, a method for combining heterogeneous metal parts is adapted for manufacturing shells of laptops, tablets, cellphones, etc., and includes step a), step b), and step c).

Figure 3:
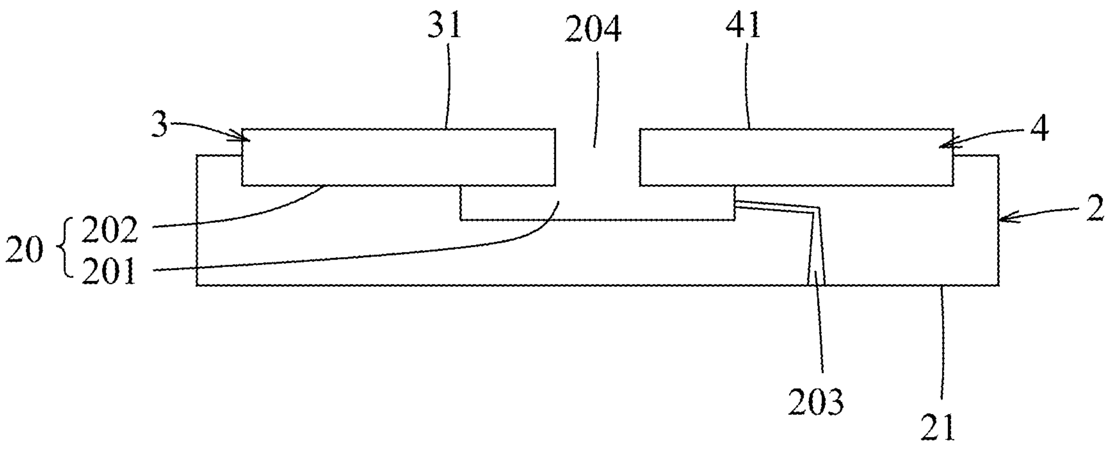
FIG. 3 is a schematic view illustrating step a) in a method for combining heterogeneous metal parts of an embodiment according to the disclosure.

Referring to FIG. 3, step a) involves disposing a first metal part 3 and a second metal part 4 in a lower mold cavity 20 of a lower mold 2. The first metal part 3 and the second metal part 4 are made of different materials. The lower mold cavity 20 has a lower portion 201, and an upper portion 202 on which the first metal part 3 and the second metal part 4 are disposed spaced apart laterally. A top surface 31 of the first metal part 3 and a top surface 41 of the second metal part 4 are disposed outwardly of the lower mold 2. The lower mold 2 includes a channel 203 that extends from an inner surface in the lower portion 201 of the lower mold cavity 20 to an outer surface 21 of the lower mold 2 and that communicates the lower portion 201 with an external environment. In this embodiment, a gap (204) is formed between the first metal part 3 and the second metal part 4. Each of the first metal part 3 and the second metal part 4 is made of a material selected from magnesium (Mg), aluminum (Al), stainless steel, or titanium (Ti).

Figure 4:
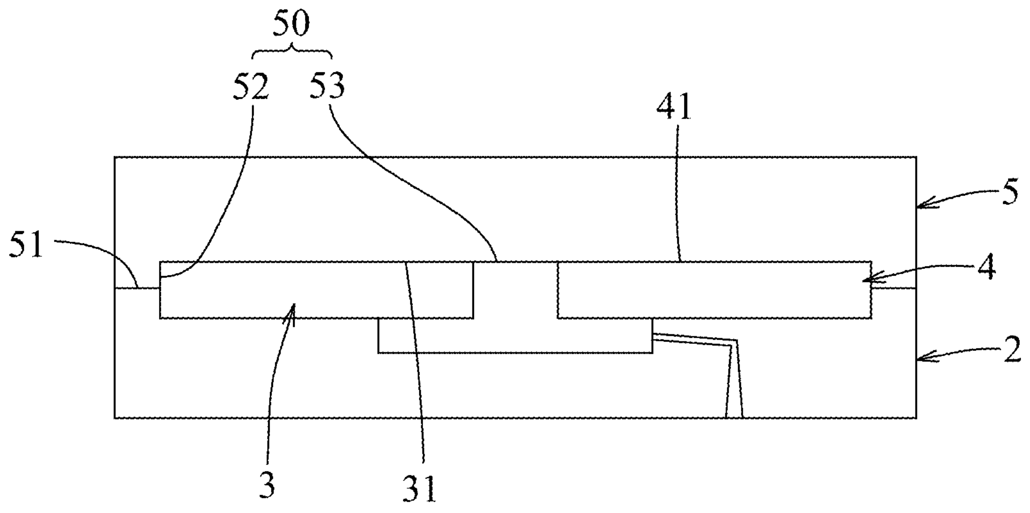
FIG. 4 is a schematic view illustrating step b) of the embodiment according to the disclosure.

Referring to FIG. 4, step b) involves combining an upper mold 5 and the lower mold 2 with an upper mold cavity 50 of the upper mold 5 facing the lower mold cavity 20. The upper mold cavity 50 is recessed from a combining surface 51 of the upper mold 5 in a direction away from the lower mold 2 to terminate at an inner base surface 53, and is defined by the inner base surface 53 and an inner surrounding surface 52 that interconnects the combining surface 51 and the inner base surface 53. The combining surface 51 of the upper mold 5 is in contact with the lower mold 2 when the upper mold 5 and the lower mold 2 are combined. The inner base surface 53 is in contact with the top surface 31 of the first metal part 3 and the top surface 41 of the second metal part 4 after combining the upper mold 5 and the lower mold 2.

Figure 5:
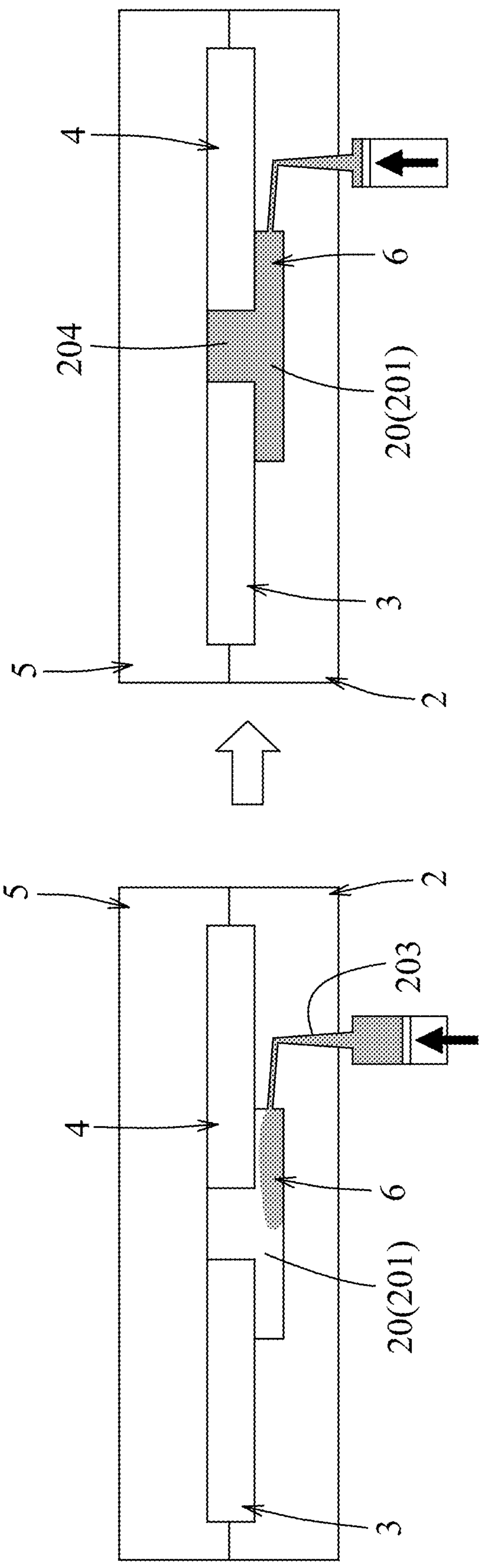
FIG. 5 is a schematic view illustrating step c) of the embodiment according to the disclosure.

Referring to FIG. 5, step c) involves injecting a bonding adhesive 6 into the channel 203 so as to fill the lower portion 201 of the lower mold cavity 20 and the gap 204 between the first metal part 3 and the second metal part 4 with the bonding adhesive 6. The bonding adhesive 6 has a viscosity so that the bonding adhesive 6 is unable to flow outside the lower mold 2 after being injecting into the channel 203.

In some embodiments, in step c), the viscosity of the bonding adhesive 6 ranges from 15000 cps to 50000 cps. In other embodiments, the bonding adhesive 6 is a thermosetting epoxy resin.

In certain embodiments, the method for combining heterogeneous metal parts further includes step d), step e) after step d), step f) after step e), and step g) after step f).

Figure 6:
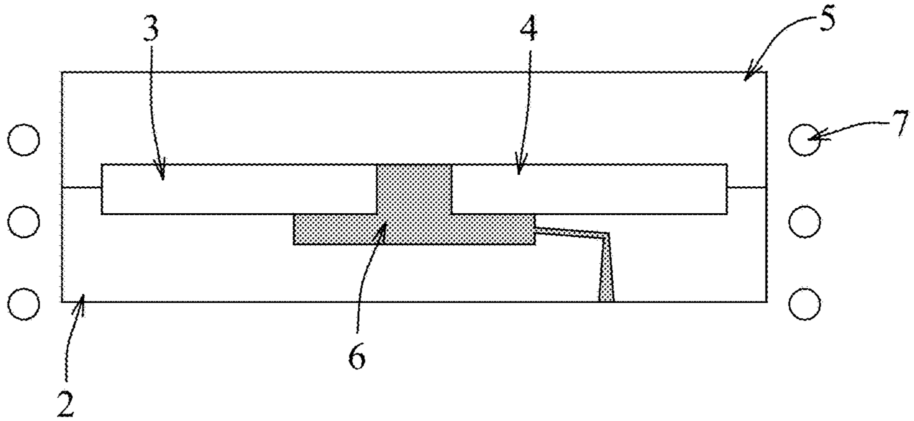
FIG. 6 is a schematic view illustrating step d) of the embodiment according to the disclosure.

Referring to FIG. 6, step d) involves curing the bonding adhesive 6 after step c) so as to combine the first metal part 3 and the second metal part 4. Specifically, step d) is conducted by heating the lower mold 2, the first metal part 3, the second metal part 4, the upper mold 5, and the bonding adhesive 6 in an oven 7 at a curing temperature ranging from 60° C. to 90° C. for a curing period of 60 seconds to 90 seconds.

Figure 7:
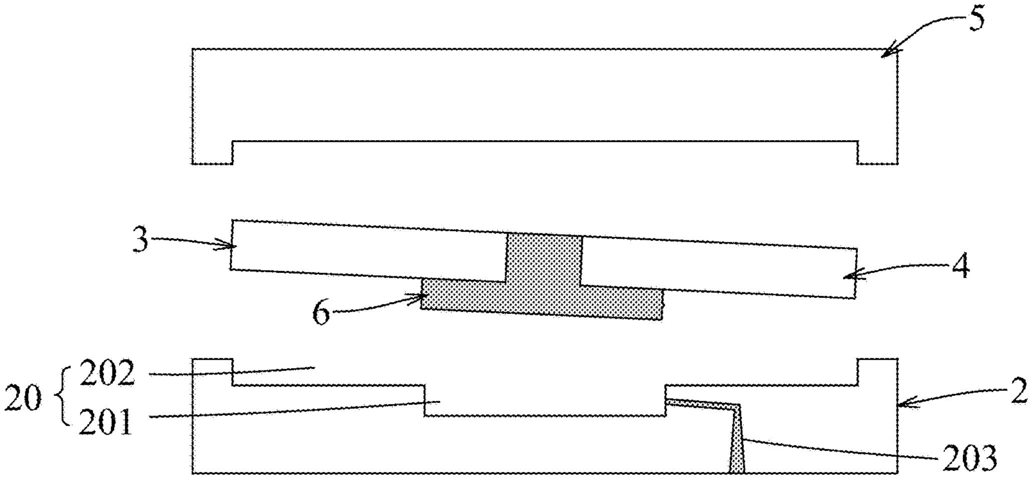
FIG. 7 is a schematic view illustrating step e) of the embodiment according to the disclosure.

Referring to FIG. 7, step e) involves removing the upper mold 5, and taking out the first metal part 3 and the second metal part 4 from the lower mold cavity 20 after the first metal part 3 and the second metal part 4 are combined by the bonding adhesive 6.

It should be noted that, to facilitate removal of the first metal part 3 and the second metal part 4 from the lower mold cavity 20 in step e) (see FIG. 7), and to avoid a minor part of the bonding adhesive 6 that is cured in the channel 203 of the lower mold 2 from obstructing the removal of the first metal part 3 and the second metal part 4 from the lower mold cavity 20 in step e) (see FIG. 7), in some embodiments, referring to FIG. 3, the channel 203 of the lower mold 2 in step a) is designed with a specific configuration. Specifically, a width of the channel 203 at the inner surface in the lower portion 201 of the lower mold cavity 20 of the lower mold 2 is smaller than a width of the channel 203 at the outer surface 21 of the lower mold 2. In some embodiments, in step a), the width of the channel 203 at the inner surface in the lower portion 201 of the lower mold cavity 20 of the lower mold 2 is no greater than 2 mm. As can be seen, due to the width of the channel 203 at the inner surface in the lower portion 201 of the lower mold cavity 20 of the lower mold 2 is no greater than 2 mm; therefore, referring to FIG. 7, the minor part of the bonding adhesive 6 in the channel 203 at the inner surface in the lower portion 201 of the lower mold cavity 20 of the lower mold 2 also has a width no greater than 2 mm. When removing the first metal part 3 and the second metal part 4, which are cured and combined by the bonding adhesive 6, from the lower mold cavity 20, a major part of the bonding adhesive 6 in the lower portion 201 of the lower mold cavity 20 may easily break away from the minor part of the bonding adhesive 6 in the channel 203.

Step f) may be conducted or not depending on a result of step c). Specifically, step f) is performed when there is an unevenness caused by an overflow of the bonding adhesive 6 at the gap 204 after step c) (e.g., the bonding adhesive 6 overflows to a clearance among the upper mold 5, the first metal part 3, and the second metal part 4). Step f) involves polishing the bonding adhesive 6 in the gap 204 and exposed from the top surface 31 of the first metal part 3 and the top surface 41 of the second metal part 4.

Figure 8:
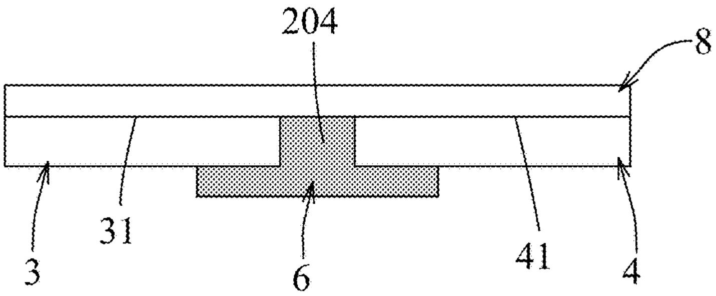
FIG. 8 is a schematic view illustrating step g) of the embodiment according to the disclosure.

Referring to FIG. 8, step g) involves spraying a paint layer 8 on the top surface 31 of the first metal part 3, the top surface 41 of the second metal part 4, and the bonding adhesive 6 in the gap 204.

Figure 2:
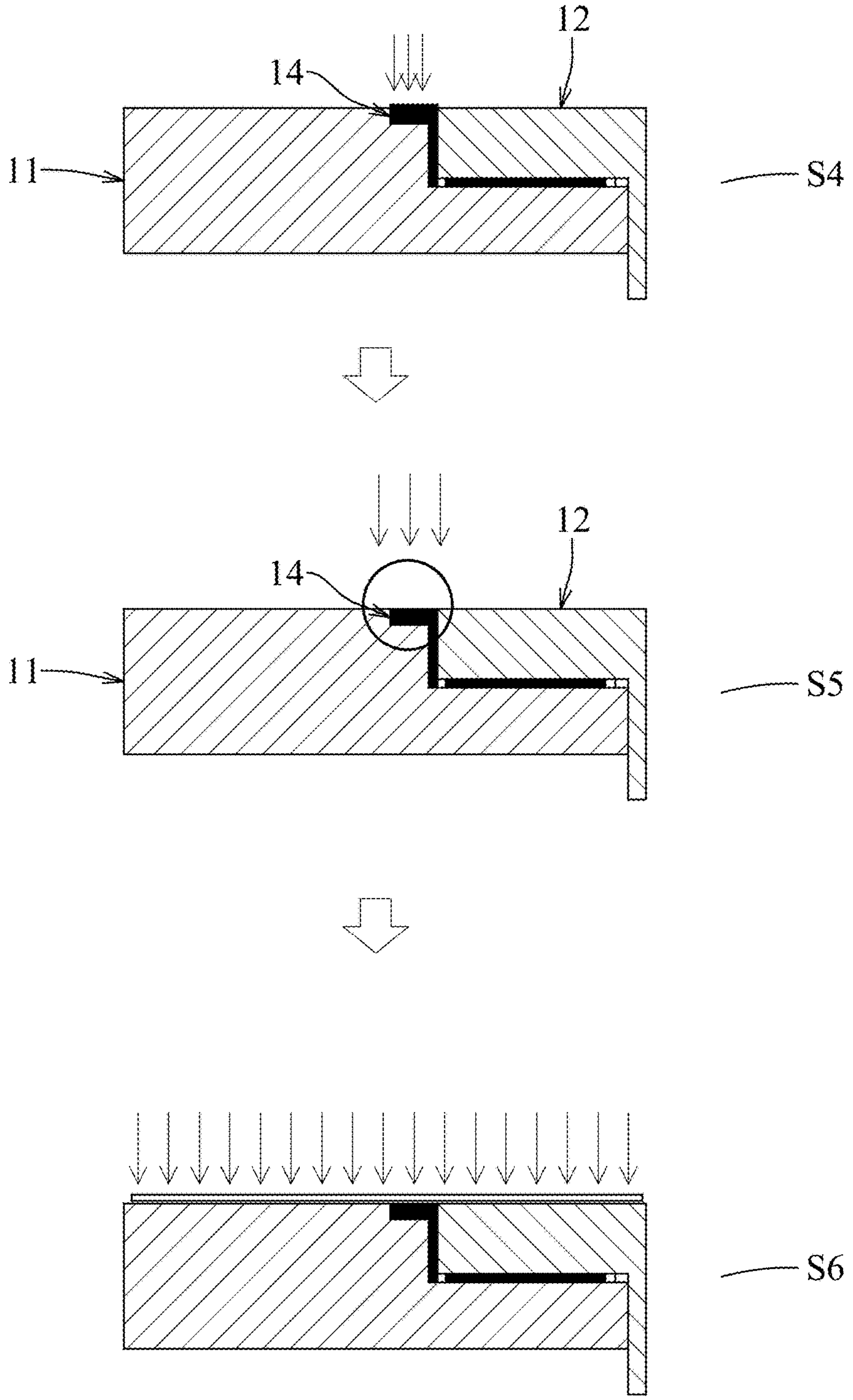
FIG. 2 PRIOR ART

As can be seen from the above detailed description of the embodiment of the disclosure, in step c), the bonding adhesive 6 may upwardly fill the gap 204 at the upper portion 202 of the lower mold cavity 20 from the lower portion 201 of the lower mold cavity 20, so as to laterally combine the first metal part 3 and the second metal part 4 in a single step. On the contrary, in CN106544674A, when combining a magnesium casting piece 11 and an aluminum frame 12, step S3 (see FIG. 1) needs to be carried out first (i.e., using a glue 13 to combine a bonding surface 111 of the magnesium casting piece 11 and a bonding surface 121 of the aluminum frame 12, followed by step S4 (see FIG. 2) (i.e., forming a nickel-aluminum material 14 in a gap between the magnesium casting piece 11 and the aluminum frame 12 by thermal spraying), to thereby completely combine the magnesium casting piece 11 and the aluminum frame 12, so the process is more tedious.

In summary, the method for combining heterogeneous metal parts according to the disclosure may combine the first metal part 3 and the second metal part 4 and fill the gap 204 between the first metal part 3 and the second metal part 4 in one step (i.e., step c)), thereby simplifying the manufacturing process, and the purpose of this disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for combining heterogeneous metal parts, comprising steps of:

a) disposing a first metal part and a second metal part in a lower mold cavity of a lower mold, the first metal part and the second metal part being made of different materials, wherein the lower mold cavity has a lower portion, and an upper portion on which the first metal part and the second metal part are disposed spaced apart laterally, a top surface of the first metal part and a top surface of the second metal part being disposed outwardly of the lower mold, the lower mold including a channel that extends from an inner surface in the lower portion of the lower mold cavity to an outer surface of the lower mold and that communicates the lower portion with an external environment;

b) combining an upper mold and the lower mold with an upper mold cavity of the upper mold facing the lower mold cavity, wherein the upper mold cavity is recessed from a combining surface of the upper mold in a direction away from the lower mold to terminate at an inner base surface, and is defined by the inner base surface and an inner surrounding surface that interconnects the combining surface and the inner base surface, the combining surface of the upper mold being in contact with the lower mold when the upper mold and the lower mold are combined, the inner base surface being in contact with the top surface of the first metal part and the top surface of the second metal part after combining the upper mold and the lower mold, wherein upon closing the upper mold with the lower mold, the top surface of the first metal part and the top surface of the second metal part are contacted by the inner base surface and are positioned in a co-planar relationship with the inner base surface; and c) injecting a bonding adhesive into the channel so as to fill the lower portion of the lower mold cavity and a gap between the first metal part and the second metal part with the bonding adhesive, wherein the bonding adhesive has a viscosity so that the bonding adhesive is unable to flow outside the lower mold after being injecting into the channel.

2. The method as claimed in claim 1, wherein in step c), the viscosity of the bonding adhesive ranges from 15000 cP to 50000 cP.

3. The method as claimed in claim 1, wherein in step c), the bonding adhesive is a thermosetting epoxy resin.

4. The method as claimed in claim 1, wherein in step a), a width of the channel at the inner surface in the lower portion of the lower mold cavity of the lower mold is smaller than a width of the channel at the outer surface of the lower mold.

5. The method as claimed in claim 4, wherein in step a), the width of the channel at the inner surface in the lower portion of the lower mold cavity of the lower mold is no greater than 2 mm.

6. The method as claimed in claim 1, further comprising step d) after step c), wherein step d) involves curing the bonding adhesive after step c) so as to combine the first metal part and the second metal part.

7. The method as claimed in claim 6, further comprising step e) after step d), wherein step e) involves removing the upper mold, and taking out the first metal part and the second metal part from the lower mold cavity after the first metal part and the second metal part are combined by the bonding adhesive.

8. The method as claimed in claim 7, further comprising step f) after step e), wherein step f) involves polishing the bonding adhesive in the gap and exposed from the top surface of the first metal part and the top surface of the second metal part.

9. The method as claimed in claim 8, further comprising step g) after step f), wherein step g) involves spraying a paint layer on the top surface of the first metal part, the top surface of the second metal part, and the bonding adhesive in the gap.

10. The method as claimed in claim 1, wherein the inner base surface is a planar surface.

11. The method as claimed in claim 1, wherein the first metal part and the second metal part are entirely spaced apart from each other.

12. The method as claimed in claim 1, wherein the top surface of the first metal part is flush with the top surface of the second metal part.

13. The method as claimed in claim 1, wherein a bottom surface of the first metal part is flush with a bottom surface of the second metal part.

14. The method as claimed in claim 1, wherein the lower portion of the lower mold cavity is located beneath both the first metal part and the second metal part.

15. The method as claimed in claim 1, wherein:

the lower mold has two edge regions which are located at two opposite sides of the upper portion of the lower mold cavity, and which are opposite to each other in a direction;

in step a), the first metal part and the second metal part are disposed in contact with the two edge regions, respectively; and the first metal part and the second metal part are spaced apart from each other in the direction.

* * * * *